United States Patent [19]
Thomas

[11] 3,765,979
[45] Oct. 16, 1973

[54] SYSTEM FOR THE FORMATION OF PIPE FITTINGS BY THE WINDING OF RESIN IMPREGNATED FILAMENTS AROUND A MANDREL

[75] Inventor: Joseph John Thomas, Somerville, N.J.

[73] Assignee: Johns-Manville Corporation, New York, N.Y.

[22] Filed: Dec. 6, 1971

[21] Appl. No.: 205,285

Related U.S. Application Data

[63] Continuation of Ser. Nos. 20,484, March 26, 1970, abandoned, and Ser. No. 714,172, March 19, 1968, abandoned.

[52] U.S. Cl.............. 156/173, 156/175, 156/425, 156/446, 285/21, 285/156, 285/293, 285/423
[51] Int. Cl.... B65h 81/00, B65h 81/08, F16l 41/02
[58] Field of Search................... 156/173, 175, 425, 156/446; 285/21, 156, 293, 423; 138/129–133, 144–145

[56] References Cited
UNITED STATES PATENTS

| | | | |
|---|---|---|---|
| 2,878,038 | 3/1959 | Noland | 156/172 |
| 977,740 | 12/1910 | Higgins | 285/156 |
| 3,186,431 | 6/1965 | Moore | 285/156 |
| 3,407,101 | 10/1968 | Lockshaw | 285/423 |
| 3,366,522 | 1/1968 | Underwood | 156/175 |
| 3,549,454 | 12/1970 | Roberts | 156/425 |

FOREIGN PATENTS OR APPLICATIONS

| | | | |
|---|---|---|---|
| 1,150,700 | 8/1957 | France | 156/172 |
| 1,000,375 | 8/1965 | Great Britain | 156/172 |

*Primary Examiner*—Daniel J. Fritsch
*Attorney*—J. A. McKinney et al.

[57] ABSTRACT

A system for forming pipe fittings having at least a pair of tubular sections by the winding of resin impregnated filaments around a mandrel wherein the mandrel's outside configuration at the intersection of said tubular sections is in the form of a bulge which, in the preferred embodiments, comprises an ellipsoid or a sphere.

11 Claims, 5 Drawing Figures

INVENTOR.
JOSEPH JOHN THOMAS
BY
ATTORNEY

INVENTOR.
JOSEPH JOHN THOMAS

SYSTEM FOR THE FORMATION OF PIPE FITTINGS BY THE WINDING OF RESIN IMPREGNATED FILAMENTS AROUND A MANDREL

This is a continuation of application Ser. No. 20,484 filed Mar. 26, 1970 and application Ser. No. 714,172 filed Mar. 19, 1968. Both of these applications are now abandoned.

FIELD OF THE INVENTION

This invention relates to pipe fittings comprising a reinforced plastic material and more particularly to fittings, such as tees and wyes, which may be used for pressure pipe service. More specifically, the invention relates to reinforced pipe fittings formed by winding resin impregnated filaments around a mandrel.

DESCRIPTION OF THE PRIOR ART

Pipes or other tubular products made by winding resin impregnated filaments around a mandrel are becoming more and more prominent in the commercial world. Since one of the features promoting the use of these products is their resistance to corrosion, it is essential that all portions of the complete pipe system be provided with at least the same resistance to corrosion. In order to be competitive, it is necessary that the fittings used in such service have the physical properties required for operational performance for a particular service including those of high strength and good corrosive resistance. However, it is equally important that these fittings be available at prices which are not exorbitant. Also, in other markets, such as asbestos-cement pipe, lined or unlined, extruded plastic pipe such as PVC, and other related products, there has long been a need for a pressure pipe fitting that would have corrosive resistant properties similar to that of the pipe. In these areas, it is especially important that the improved products be marketed at competitive prices.

SUMMARY OF THE INVENTION

It is an object of this invention to provide a pipe fitting comprising a reinforced plastic material having the required properties of high strength and corrosive resistance at reasonable costs.

It is another object of this invention to provide a system for the manufacture of pipe fittings comprising a reinforced plastic material suitable for pressure pipe service by the winding of resin impregnated filaments around a mandrel.

The foregoing objects are accomplished in accordance with the instant invention by providing a mandrel having at least a pair of intersecting tubular sections around which the resin impregnated filaments are to be wound. The outside configuration of the mandrel at the intersection of the tubular sections is in the form of a bulge which, in the preferred embodiments of the invention, comprises an ellipsoid or a sphere. In the specific illustration in this application, the bulge is in the form of a portion of a sphere. This bulge facilitates the winding of the resin impregnated filaments so that complete coverage of all areas of the fitting may be obtained with only relatively simple motion of the resin impregnated filaments during the winding of the fitting. Also, the bulge allows the complete coverage of all areas of the fitting with a minimum number of layers of the resin impregnated filaments. The reinforced pipe fittings produced by the system of this invention provide high strength and corrosive resistant pipe fittings that may be used with all kinds of pipe, such as asbestos-cement pipe, plastic pipe, and reinforced plastic pipe for pressure service.

BRIEF DESCRIPTION OF THE DRAWING

The invention will be more fully understood and further objects and advantages thereof will become apparent when reference is made to the following detailed description of a preferred embodiment of the invention and the accompanying drawings in which.

DESCRIPTION OF THE PREFERRED EMBODIMENT

Figure 1:
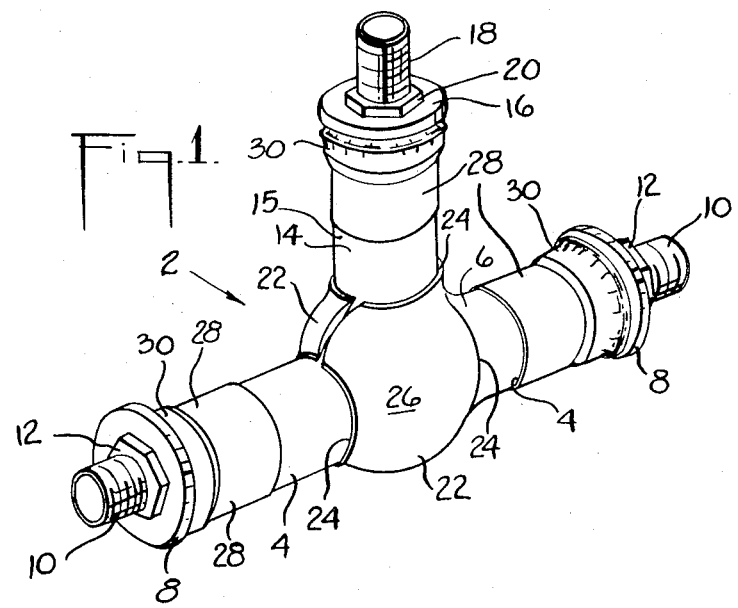
FIG. 1 is a pictorial representation of a mandrel on which a fitting, such as a tee, may be formed in accordance with the instant invention.

Referring to the drawings and in particular to FIG. 1, there is illustrated in assembled relationship a mandrel 2 comprising a plurality of separable parts which, in assembled relationship, unite to form an integral tee. The arms 4 of the tee comprise a hollow cylindrical tube 6 having an end cap 8 adjacent each axial extremity and a central opening (not shown). A threaded bolt 10 extends through the end caps 8 and the hollow cylindrical tube 6, and a nut 12 on each end of the bolt holds end caps 8 in contact with the adjacent axial extremity of the tube 6. The stem 14 of the tee comprises a hollow cylindrical tube 15 having at its axial extremity adjacent the tube 6 a portion cut away (not shown) so as to straddle the upper portion of the tube 6. An end cap 16 is located adjacent the other axial extremity of the tube 15. A threaded bolt 18, removably connected by any desirable means (not shown) to the bolt 10, extends through the central opening in the tube 6, the tube 15, and the end cap 16. A nut 20 holds the end cap 16 in contact with the adjacent axial extremity of the tube 15.

The area adjacent the intersection of the tubes 6 and 15 is covered by a pair of mating members 22 which, when assembled in mating relationship, have a hollow interior with three cylindrical openings 24 in contiguous relationship with the adjacent external surface of the tubes 6 and 15. The central body portion 26 formed by the members 22 is in the form of a bulge having an outside diameter greater than the outside diameter of the tubes 6 and 15. The configuration of outer surface of the center body portion is arcuate in nature and preferably has the general form of an ellipsoid or a sphere. In the embodiment illustrated in FIGS. 1–5, inclusive, the central body portion is in the form of a sphere. It has been found that the ratio of the maximum outside diameter of the central body portion to the outside diameter of the arms 4 or the stem 14 should be about 7:5 or greater.

In most operations, it is desirable to form the final fitting with a bell end adjacent each axial extremity and to provide each of such bell ends with an annular groove in its inner surface. In those instances where bell ends are desirable, a sleeve 28 comprising a resilient material, such as rubber, neoprene, or other similar material, and having a raised annular rib 30 is positioned over each tube 6 and 15 adjacent each axial extremity. Each sleeve 28 is slideable over its associated tube but has a suitable frictional resistance therewith so that it will tend to remain where it is positioned. Thus, as illustrated in FIG. 1, each sleeve 28 is positioned on its associated tube 6 or 15 adjacent the axial extremity thereof and in contact with the associated end cap 8 or 16.

It is understood that the foregoing description of the mandrel 2 is made for illustration purposes only so as to provide a base on which the fittings may be formed, and the particular manner for forming the mandrel may be varied and still remain within the scope of the invention. Also, it is recognized that shapes other than the tee illustrated in the drawings may be formed. However, whatever means are used to form the mandrel or whatever the shape of the fittings, it is necessary that the central body portion have the bulging exterior surface as described above.

Figure 2:
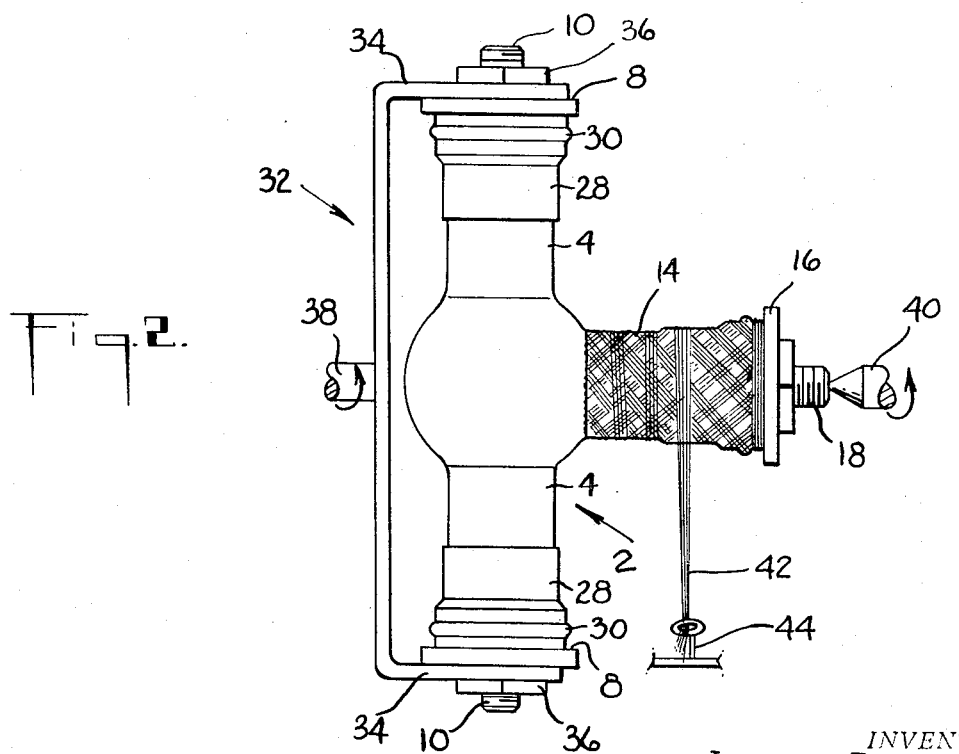
FIG. 2 is a view in elevation of the winding of the stem section of the tee of FIG. 1.
Figure 3:
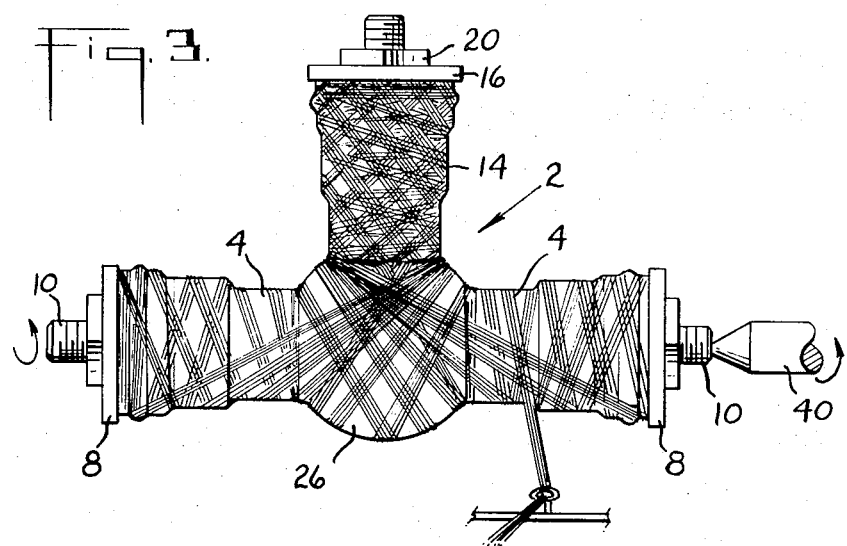
FIG. 3 is a front view in elevation of the winding of arms and the central body portion of the tee of FIG. 1.
Figure 4:
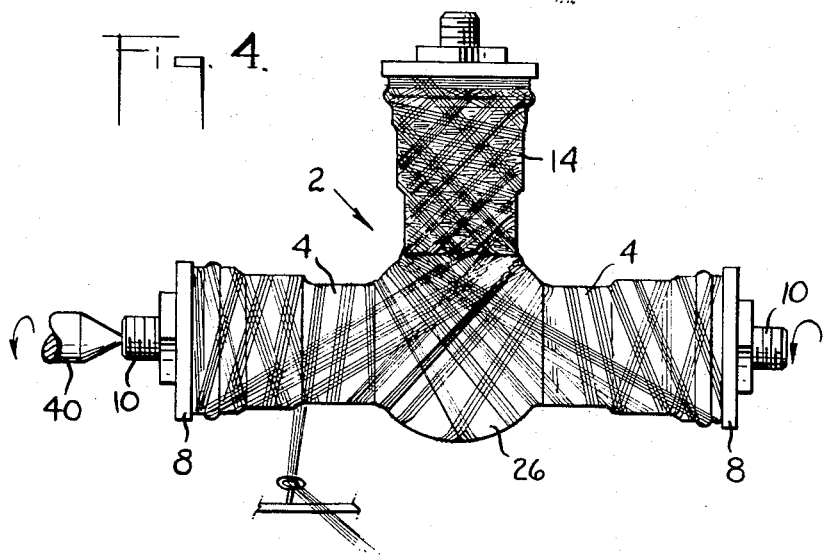
FIG. 4 is a rear view in elevation of FIG. 3.

The method of forming a fitting such as a tee is illustrated in FIGS. 2-4, inclusive. A mandrel 2 is first covered with a gel coat over all of its exterior surface. This gel coat may be comprised of any suitable material, but in the preferred embodiment of the invention, it comprises a polyurethane composition which is applied by spraying over the exterior surface of the mandrel so as to build a coating thereon having a minimum thickness at any location of at least about 5 mils. The coating composition is allowed to advance to the partially cured or set stage and the mandrel is then placed in suitable apparatus for the winding of the resin impregnated filaments thereon.

As is illustrated in FIG. 2, it is preferred that the winding of the resin impregnated filaments be started first on the stem 14 of the tee. The mandrel 2 is mounted in the holder 32 by any suitable means such as by placing the bolts 10 in slots formed in projections 34 of the holder 32 and securing the mandrel in position by threaded fasteners 36. A projection 38 on the holder 32 is adapted to be secured in any type of power source (not shown) so that the holder 32 and the mandrel 2 may be rotated in the direction indicated by the arrows. The mandrel 2 is further secured in rotatable position by a rod 40 in contact with a suitable receptacle in the end of the bolt 18, and the rod 40 is journalled for rotation in any desirable means (not shown).

With the mandrel 2 stationary, the ends of a plurality of rovings 42, each comprising a plurality of strands of resin impregnated filaments, preferably glass filaments impregnated with a suitable epoxy resin formulation, are hand wrapped a few turns around the stem 14 of the tee. The rotation of the mandrel 2 is then started and the rovings 42 are pulled through the guide 44 and wrapped around the stem 14. The guide 44 is reciprocated along a path generally parallel to the axis of rotation to the stem 14 and a plurality of layers of the resin impregnated filaments are wound thereon in a criss-crossing relationship. The winding is stopped when the desired thickness of the layers of resin impregnated filaments is reached. The layers of the resin impregnated filaments extend from a location contiguous to the end cap 16 to a location tangent to the central body portion 26. After the winding of the stem 14 has been completed, the mandrel 2 is removed from the holder and is ready for further operations.

In FIGS. 3 and 4, there is illustrated the system for the mounting of the mandrel 2 for the winding of the resin impregnated filaments around the arms 4 and the central body portion 26. The mandrel 2 is mounted with one end of the bolt 10 secured to a power source (not shown) so as to rotate the mandrel 2 in the direction indicated by the arrow. Rod 40 is again used and cooperates with the other end of bolt 10 to support the mandrel 2 in the rotatable position. With the mandrel 2 stationary, the winding operation, as illustrated in FIG. 3, begins by hand wrapping a few turns of the resin impregnated filaments around the central body portion 26 of the tee. The rotation of the mandrel 2 is then started and the resin impregnated filaments are pulled through the guide 44 and wrapped in a criss-crossing relationship around the central body portion 26 and the arms 4 of the mandrel. During the winding of the resin impregnated filaments over the central body portion, the rotation of the mandrel is synchronized with the reciprocation of the guide means 44 so as to provide for the passage of the stem 14.

The provision of the bulge at the central body portion allows for the uniform winding of the resin impregnated filaments in this area and the complete coverage thereof. If the bulge is omitted, severe difficulties would be encountered in providing a uniform winding with no void areas particularly at those areas adjacent the intersection of the stem and the central body portion. It is possible to solve the problem of void areas at these intersections by other means such as inlays of reinforcing tape or fabric, by multiple filament delivery stations, by complex mandrel design with multiple planes of rotation, and multiple bearing or holding sites, but all these solutions increase the cost of making the fittings to such an extent that the operation is commercially nonfeasible or the resulting product is lacking in strength at the intersection. The instant invention by providing the central body portion with a bulge allows for the winding of this area of the fitting with relatively simple apparatus and a minimum of time and material so as to make such fittings commercially practical.

After a sufficient number of layers have been formed over the arms and central body portion, the mandrel 2 with the complete fitting formed thereon is moved to a curing station where the resin in the fitting is cured. If desired, the curing of the resin is accomplished with the application of heat, and the mandrel with the fitting thereon is rotated during curing so as to maintain an even distribution of resin. After the resin has been cured, the mandrel is removed and is ready for use.

The following is a description of the formation of a fitting for 2-inch plastic pipe for pressure service such as that marketed by Johns-Manville Corporation under the trade designation PVC "RING-TITE" Class 150 plastic pipe. A mandrel 2, such as the one illustrated in FIG. 1, is assembled into an integral unit. The crevices occurring at the junction of various parts of the assembled mandrel are sealed off and the mandrel is sprayed with a suitable release coating comprising a fluorocarbon resin in a trichloroethylene carrier such as that marketed by the McGee Chemical Company under the trade designation "McLube No. 1711". The mandrel is then sprayed with a composition to provide a base or gel coat on the mandrel. This gel coat is very important to the operational characteristics of the finished fitting. If the gel coat is to be applied by brushing, a suitable composition comprises 100 parts of a polyurethane resin such as that marketed by E.I. duPont de Nemours & Company, Inc. under the trade designation "ADIPRENE L167" and 20 parts of [4,4'-methylene-bis-(2-chloroaniline)] such as that marketed by E.I. duPont de Nemours & Company, Inc. under the trade designation "MOCA". If the gel coat is applied by spraying, a suitable composition comprises 600 parts of a polyurethane resin such as that marketed by E.I. duPont de Nemours & Company, Inc. under the trade designation "ADIPRENE L167"; 340 parts of toluene such as that marketed by Americal Mineral Spirits Company under the trade designation "AMSCO" toluene; 92.3 parts of methylene dianiline such as that marketed by Dow Chemical Company; and 831 parts of ethyl acetate such as that marketed by Dodge & Olcott, Inc. In the instant example, a gel coat formed by spraying until a coating having a minimum thickness of about 5 mils is formed provides an ideal base or gel coat.

After the gel coat has been formed and partially cured, the mandrel 2 is placed in the holder 32 and mounted for rotation. While the mandrel is stationary, a plurality of rovings 42 each comprising a plurality of strands wherein each strand comprises about 200 or more filaments, preferably glass, such as that marketed by Johns-Manville Corporation under the trade designation J-M Roving, 60 END, G135, with M393 binder are fed through the guide 44 and a few turns thereof are hand wrapped around the end of the stem 14 adjacent the end cap 16. Prior to passing through the guide 44, the rovings 42 are pulled through a bath (not shown) wherein they are impregnated with a suitable resin composition comprising an epoxy, phenolic, polyester, or other similar formulation. In the instant example, the rovings are impregnated with an epoxy resin formulation comprising 100 parts of an epoxy resin such as that marketed by Union Carbide under the trade designation ERL 2772; 18.75 parts of a modified polyamine hardener such as that marketed by Union Carbide under the trade designation ZZL0803; 12.5 parts of a modified polyamine hardener such as that marketed by Celanese Chemical Corporation under the trade designation EPI CURE 874; and 0.1 parts of blue epoxy pigment such as that marketed by Pigment Dispersions, Inc. under the trade designation No. 2301. Rotation of mandrel 2 is commenced and the rovings of resin impregnated filaments are wound around the stem 14 until a thickness of between about 0.16 and 0.25 inches has been reached. The winding operation is then ceased and the mandrel moved to the supported position illustrated in FIGS. 3 and 4.

Figure 5:
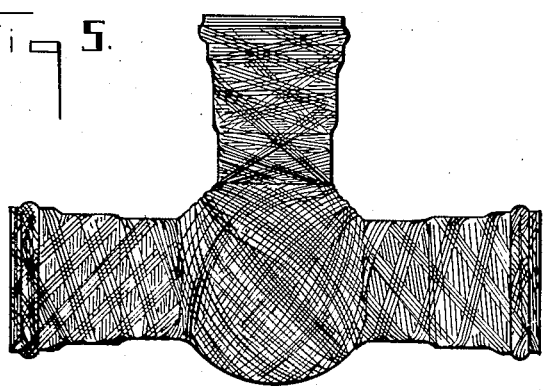
FIG. 5 is a view in elevation of a fitting formed in accordance with FIGS. 1–4, inclusive.

The winding of the arms 4 and the central body portion 26 is commenced by hand wrapping a few turns of the rovings 42 of resin impregnated filaments around the central body portion 26. The rotation of the mandrel is commenced and the filaments are first wound around the central body portion 26, as illustrated in FIGS. 3 and 4, in a criss-crossing relationship. The first intersection of the filaments occurs adjacent the portion of the central body portion 26 diametrically opposite to the stem 14. As the rotation of the mandrel is continued, the filaments are wound so that the intersection gradually moves from its initial position diametrically opposite the stem 4 over the outer surface on both sides of the central body portion 26 toward the stem 14 until the central body portion is completely covered by the criss-crossing filaments. The filaments are then wound in turn over each of the two arms 4 during the continued rotation of the mandrel. Sufficient layers of the resin impregnated filaments are wound on the mandrel by repeating the foregoing winding procedure until the desired wall thickness has been produced in all portions of the arms 4 and the central body portion 26. For the 2-inch tee of the instant example, this thickness is the same as that described above for the stem, that is, between about 0.16 and 0.25 inches. The mandrel 2 with the fittings formed thereon is then removed to a curing station. In the instant example, the curing of the epoxy resin is accomplished by placing the mandrel 2 with the fitting thereon in a suitable heated environment having a temperature of about 200°F. and means are provided for rotating the mandrel with the fitting thereon during curing so as to maintain the even distribution of the epoxy resin. After curing, the mandrel is removed, post cured at about 200°F., and the fitting, as illustrated in FIG. 5, is ready for use.

It is understood that the foregoing description is for illustration purposes only and is not intended to limit the invention in any manner. The mandrel 2 may be formed by any suitable means so as to provide the various contours desired in the inner surface of the fitting to be produced. Also, it is evident that shapes other than the tee illustrated in the drawing may be formed. The thickness of the layers of the resin impregnated filaments may be varied over a wide range depending on the operational characteristics desired in the finished fitting and the size of the pipe with which it is to be used. Thus, in the foregoing example of the 2-inch tee, the thickness of the layers of the resin impregnated filaments was stated as being between about 0.16 and 0.25-inch, but a tee for a 12-inch pipe for pressure service may have a wall thickness as great as 1.08 inches.

Although the mandrel 2 may be formed by means other than that illustrated in the drawings and described above, it is necessary that any mandrel for use in this system be provided with the bulge at the central body portion. In practice, it has been found that the contour or the outer surface of the bulge is desirably in the form of an ellipsoid or a sphere, but preferably in the form of a sphere. The ratio of the maximum outside diameter of the bulge to the outside diameter of the surface area immediately adjacent the bulge should be about 7:5 or greater. It has also been found that in some sizes and shapes the center of the bulge should be located a short distance from the intersection of the central longitudinal axes of the various projecting sections. Thus, in the tee of the type illustrated in FIGS. 1-5, inclusive, the center of the sphere of the central body portion 26, if desired, could be located on the central longitudinal axis of the tube 14 and spaced a predetermined distance from the central longitudinal axis of the arms 4 in the direction of the end cap 16. In forming a tee for 10-inch pipe, this distance would be about 1 inch. As described above, the provision of this bulge allows for a uniform winding of the resin impregnated filaments so as to form a fitting with no void areas adjacent the intersection of the projecting sections such as the intersection of the stem and arms at the central body portion in the tee illustrated in FIGS. 1-5, inclusive.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. In the method for forming pipe fittings in which resin impregnated filaments are wound around an integral mandrel having at least two tubular sections with longitudinal axes which if extended would intersect, the resin impregnated filaments are cured after the mandrel is wound, and the mandrel is removed from the pipe fitting formed, the improvement comprising:
   a. providing a mandrel having at least two tubular sections connected by a body portion wherein said body portion has a bulging exterior surface and wherein for all of said tubular sections the radial distance from an extended axis of any one of said tubular sections to any point on said bulging exterior surface of said body portion that is located adjacent said one tubular section is greater than the radial distance from the axis of said one tubular section to any point on an exterior surface of said one tubular section that is located adjacent said body portion,
   b. rotating the mandrel about the axes of said tubular sections, and
   c. wrapping resin impregnated filaments on said tubular sections and said body portion while the mandrel is being rotated until a pipe fitting is formed.

2. The improvement as defined in claim 1 and further comprising:
   a. rotating said mandrel about the axis of said one tubular section,
   b. subsequently rotating said mandrel about the axis of each of said tubular sections which is not coaxial with said one tubular section, and
   c. wrapping resin impregnated filaments on said tubular sections when said tubular sections are coaxial with the axis of rotation of said mandrel while also wrapping said body portion until a pipe fitting is formed.

3. A reinforced plastic pipe fitting formed in accordance with the method of claim 1.

4. In apparatus for use in the formation of a pipe fitting wherein resin impregnated filaments are wound around a mandrel, said mandrel having at least two tubular sections having longitudinal axes which, if extended, would intersect, said mandrel being adapted to be removed from the formed fitting, and said apparatus including means for wrapping said resin impregnated filaments around said mandrel, the improvement in said mandrel comprising:
   a. said mandrel having a body portion connecting said tubular sections into an integral unit, and
   b. said body portion having a bulging exterior surface wherein for all of said tubular sections the radial distance from an extended axis of any one of said tubular sections to any point on said bulging exterior surface of said body portion that is located adjacent said one tubular section is greater than the radial distance from the axis of said one tubular section to any point on an exterior surface of said one tubular section that is located adjacent said body portion.

5. The improvement as defined in claim 4 wherein: the ratio of body portion diameter to tubular section diameter is at least 7:5.

6. The improvement as defined in claim 4 wherein:
   a. the bulging exterior surface of said body portion is spherical.

7. The improvement as defined in claim 6 wherein:
   a. the ratio of body portion diameter to tubular section diameter is at least 7:5.

8. The improvement as defined in claim 6 wherein:
   a. the center of said body portion is offset from the intersection of said axes.

9. The improvement as defined in claim 4 wherein:
   a. the bulging exterior surface of said body portion is ellipsoidal.

10. The improvement as defined in claim 9 wherein:
    a. the ratio of body portion diameter to tubular section diameter is at least 7:5.

11. The improvement as defined in claim 9 wherein:
    a. the center of said body portion is offset from the intersection of said axes.

* * * * *